US011240024B2

(12) United States Patent
Villapakkam et al.

(10) Patent No.: US 11,240,024 B2
(45) Date of Patent: Feb. 1, 2022

(54) CRYPTOGRAPHIC KEY MANAGEMENT USING KEY PROXIES AND GENERATIONAL INDEXES

(71) Applicant: EMC IP Holding Company LLC, Hopkinton, MA (US)

(72) Inventors: Sridhar Villapakkam, Grafton, MA (US); Ajit Bhagwat, Lexington, MA (US); Frank Samuel Caccavale, Hopedale, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 363 days.

(21) Appl. No.: 16/524,372

(22) Filed: Jul. 29, 2019

(65) Prior Publication Data
US 2021/0036851 A1 Feb. 4, 2021

(51) Int. Cl.
| | | |
|---|---|---|
| *H04L 9/08* | (2006.01) | |
| *H04L 9/32* | (2006.01) | |
| *G06F 21/60* | (2013.01) | |
| *G06F 16/22* | (2019.01) | |

(52) U.S. Cl.
CPC ............ *H04L 9/0894* (2013.01); *G06F 16/22* (2019.01); *G06F 21/602* (2013.01); *H04L 9/321* (2013.01)

(58) Field of Classification Search
CPC ..... H04L 9/0894; H04L 9/321; G06F 21/602; G06F 16/22
USPC .......................................................... 713/155
See application file for complete search history.

(56) References Cited

U.S. PATENT DOCUMENTS

| | | | | |
|---|---|---|---|---|
| 5,594,899 | A * | 1/1997 | Knudsen | ................... G06F 8/31 |
| 7,502,467 | B2 | 3/2009 | Brainard | |
| 8,059,814 | B1 | 11/2011 | Duane | |
| 8,379,857 | B1 * | 2/2013 | Zheng | ................... H04L 9/0833 |
| | | | | 380/255 |
| 8,566,952 | B1 * | 10/2013 | Michaels | ................ G06F 21/32 |
| | | | | 726/27 |

(Continued)

OTHER PUBLICATIONS

NPL Search Terms (Year: 2021).*

(Continued)

*Primary Examiner* — Syed A Zaidi
(74) *Attorney, Agent, or Firm* — Ryan, Mason & Lewis, LLP

(57) ABSTRACT

Techniques are provided to implement a key management service using key proxies and generational indexes, which allows client applications to obtain data cryptographic services without having to utilize or otherwise have knowledge of cryptographic keys. For example, a key management service receives a data decryption request from a client application. The data decryption request includes encrypted data and a key proxy assigned to the client application. The key management service determines a generational index associated with the encrypted data. The generational index identifies a generation of a cryptographic key which is associated with the key proxy and which was used to create the encrypted data. The key management service obtains a cryptographic key from a secure key vault, which is mapped to the received key proxy and the determined generational index, decrypts the encrypted data using the obtained cryptographic key, and sends the decrypted data to the client application.

20 Claims, 6 Drawing Sheets

(56) References Cited

U.S. PATENT DOCUMENTS

| | | | |
|---|---|---|---|
| 8,588,425 B1* | 11/2013 | Harwood | H04L 9/0894 |
| | | | 380/286 |
| 8,645,681 B1 | 2/2014 | D'Souza | |
| 9,594,918 B1 | 3/2017 | Robinson et al. | |
| 2003/0037237 A1* | 2/2003 | Abgrall | H04L 63/062 |
| | | | 713/166 |
| 2005/0278527 A1* | 12/2005 | Liao | G06F 21/6209 |
| | | | 713/165 |
| 2006/0291664 A1* | 12/2006 | Suarez | G06F 21/33 |
| | | | 380/286 |
| 2009/0034733 A1* | 2/2009 | Raman | H04L 9/083 |
| | | | 380/277 |
| 2012/0117341 A1* | 5/2012 | Amit | G06F 16/116 |
| | | | 711/159 |
| 2012/0266209 A1* | 10/2012 | Gooding | H04L 63/20 |
| | | | 726/1 |
| 2014/0019753 A1* | 1/2014 | Lowry | H04L 9/083 |
| | | | 713/155 |
| 2017/0324550 A1* | 11/2017 | Yuan | H04L 63/062 |
| 2020/0136822 A1 | 4/2020 | Villapakkam et al. | |

OTHER PUBLICATIONS

U.S. Appl. No. 16/175,356, filed Oct. 30, 2018, entitled "Secure Distributed Storage of Encryption Keys."
Dell EMC, "Dell EMC Unity: Cloud Tiering Appliance (CTA) A Detailed Review," White Paper, Jul. 2017, 24 pages.

* cited by examiner

CRYPTOGRAPHIC KEY MANAGEMENT USING KEY PROXIES AND GENERATIONAL INDEXES

FIELD

This disclosure relates generally to cryptographic key management and, in particular, to cryptographic key management techniques for distributed storage systems and cloud computing systems.

BACKGROUND

Currently, cloud computing services are provided globally to millions of users and customers who reside in different geolocations (e.g., countries, continents, etc.). Various entities provide private or public cloud computing services globally to different customers over various sectors for critical and non-critical applications. These entities provide various cloud computing services including, for example, Software-as-a-Service (SaaS), Infrastructure-as-a-Service (IaaS), and/or Platform-as-a-Service (PaaS). Cloud computing services are commonly used for storing user data "in the cloud." For example, users may subscribe to a service over a communications network which stores the users' data in a widely-distributed storage system. This approach is advantageous in that it allows users to access their data from any location and using different devices, while also providing protection against catastrophic loss of data at any one physical location.

To preserve user privacy and protect against unauthorized access and use of stored cloud data, a cloud computing service typically implements a data encryption system to encrypt the user data and store the user data in encrypted form. To support encryption services in the cloud, key management servers are typically implemented to create, store and manage cryptographic keys that are used for encrypting and decrypting data. As hundreds or thousands or more users typically store data within the same distributed storage system managed by a cloud service, the key management servers must generate and maintain different cryptographic keys for the different users (or possibly several cryptographic keys per user). When a client application (e.g., data storage application) requires access to stored data on behalf of a given end-user, the client application will communicate with the key management server to request and access the proper cryptographic key needed to encrypt the user data, and the key management server will send the associated cryptographic key to the client application requesting the key. With such conventional key management techniques, the client application has the burden of determining and obtaining the proper encryption key, which becomes more problematic as end-user encryption keys are rotated, expired, revoked, or otherwise change over time. Moreover, sending cryptographic keys to client applications can pose security risks as the cryptographic keys are exposed to potential unauthorized access and malicious use by hackers.

SUMMARY

Exemplary embodiments of the disclosure include techniques for implementing a cryptographic key management service using key proxies and generational indexes, which allows client applications to obtain data encryption and decryption services without having to access and utilize cryptographic keys, and without requiring the client applications to have knowledge of the cryptographic keys or changes to the cryptographic keys, or otherwise perform any management-related actions with respect to the cryptographic keys or changes to the cryptographic keys.

For example, one embodiment includes a method which is implemented by a key management service executing on a first computing system. The key management service receives a data decryption request from a client application executing on second computing system, wherein the data decryption request comprises encrypted data and a key proxy assigned to the client application. The key management service determines a generational index associated with the encrypted data, wherein the generational index identifies a generation of a cryptographic key which is associated with the key proxy and which was used to create the encrypted data. The key management service obtains a cryptographic key from a secure key vault, which is mapped to the received key proxy and the determined generational index. The key management service decrypts the encrypted data using the obtained cryptographic key to generate decrypted data. The key management service sends the decrypted data to the client application.

In another embodiment, the key management service receives a data encryption request from the client application, wherein the data encryption request comprises data to be encrypted and the key proxy assigned to the client application. The key management service determines a current generational index associated with the key proxy, wherein the current generational index identifies a primary version of a cryptographic key which is associated with the key proxy and which is used, by default, to encrypt the data received from the client application. The key management service obtains a cryptographic key from the secure key vault, which is mapped to the received key proxy and the current generational index. The key management service encrypts the received data using the obtained cryptographic key to generate encrypted data. The key management service sends the encrypted data to the client application.

Other embodiments of the disclosure include, without limitation, computing systems and articles of manufacture comprising processor-readable storage media for implementing a cryptographic key management service.

DETAILED DESCRIPTION

Exemplary embodiments of the disclosure will now be described in further detail with regard to systems and methods for implementing a cryptographic key management service using key proxies and generational indexes, which allows client applications to obtain data encryption and decryption services without having to access and utilize cryptographic keys, and without requiring the client applications to have knowledge of changes to cryptographic keys or otherwise perform any management-related actions related to such changes in the cryptographic keys.

Figure 1:
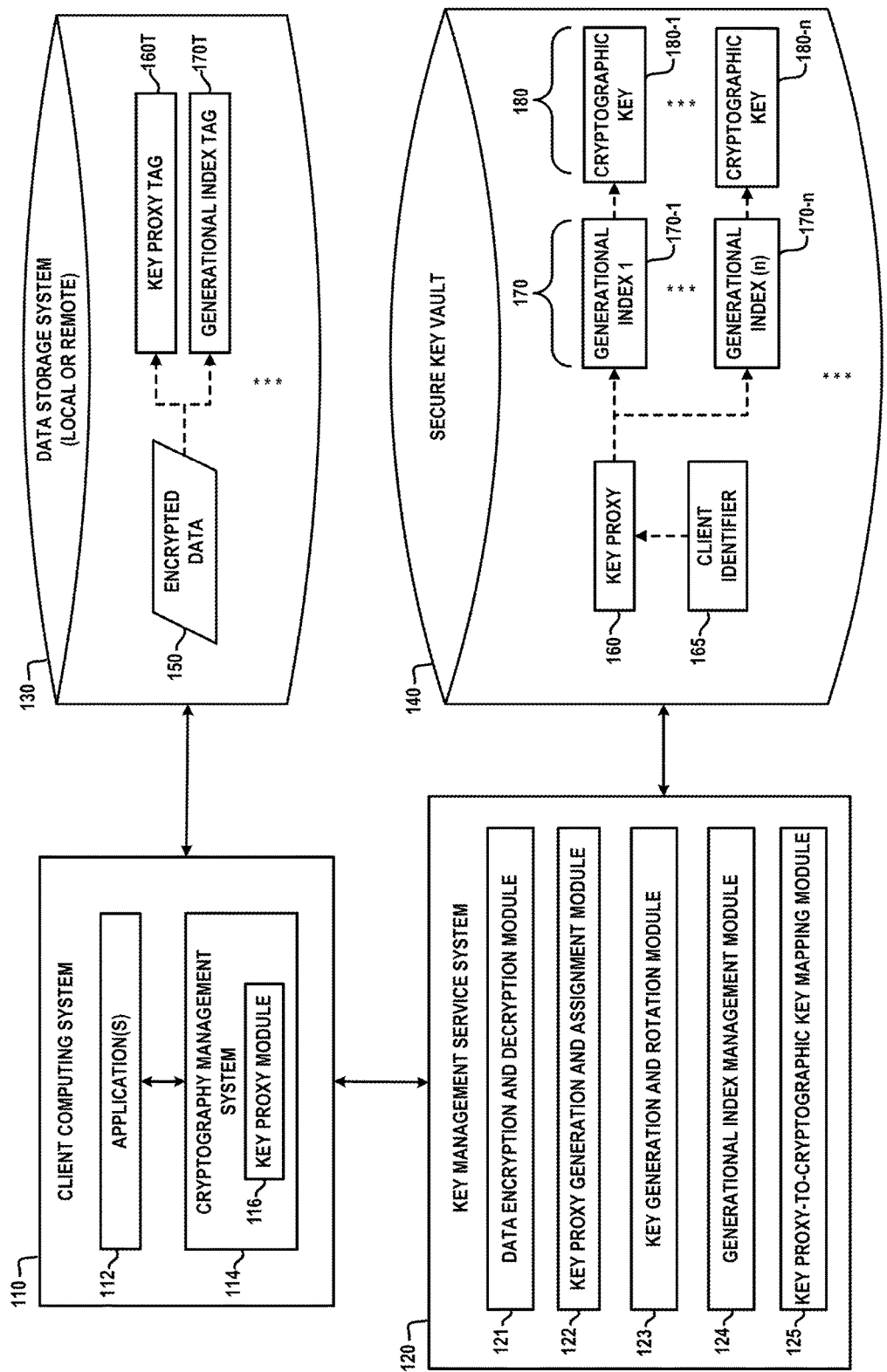
FIG. 1 is a high-level schematic illustration of a system which implements a cryptographic key management service according to an exemplary embodiment of the disclosure.

For example, FIG. 1 is a high-level schematic illustration of a system 100 which implements a cryptographic key management service according to an exemplary embodiment of the disclosure. The system 100 comprises a client computing system 110, a key management service system 120 (or key management service), a data storage system 130, and a secure key vault 140. The client computing system 110 comprises one or more applications 112, and a cryptography management system 114, which execute on the client computing system 110. The cryptography management system 114 comprises a key proxy module 116. The key management service 120 comprises a system of software modules, wherein the software modules comprise a data encryption and decryption module 121, a key proxy generation and assignment module 122, a key generation and rotation module 123, a generational index management module 124, and a key proxy-to-cryptographic key mapping module 125 (alternatively "mapping module").

The client computing system 110 may comprise one of various types of computing systems or devices such as a desktop computer, a laptop computer, a workstation, a computer server, an enterprise server, a rack server, a smart phone, an electronic tablet, etc. The key management service 120 executes on a computing system such as a desktop computer, a laptop computer, a workstation, a computer server, an enterprise server, a rack server, etc. In some embodiments, the key management service 120 executes on a computing system which is separate and remote from the client computing system 110, and in some embodiments, the key management service 120 executes on the client computing system 110.

The applications 112 which execute on the client computing system 110 include one or more of various types of applications including, but not limited to, end-user applications, data storage applications, operating systems, storage servers, file systems, database applications, etc., or other types of applications which store and access data (e.g., encrypted data) to and from the data storage system 130. In some embodiments, the data storage system 130 comprises a local data storage system (i.e., locally resides with the client computing system 110) which comprises one or more different types of persistent storage devices, or data storage arrays, such as hard disk drives (HDDs), solid-state drives (SSDs), or other types and combinations of persistent storage systems implemented using, e.g., direct attached storage (DAS) systems, etc. In some embodiments, the data storage system 130 comprises a remote data storage system, e.g., cloud-based distributed storage system, network attached storage (NAS), a storage area network (SAN) system, etc., which is remotely accessible by the client computing system 110 over a storage and/or communications network. In some embodiments, the data storage system 130 can be an enterprise-class storage platform comprising high-performance, scalable storage arrays, for use with hyper-scale computing systems. For example, the data storage system 130 can be implemented using commercially available storage array systems and applications of Dell EMC including, but not limited to, NSS, XtremIO, UNITY, VMAX, VNX, ScaleIO, etc.

The cryptography management system 114 comprises a client application (e.g., an application programming interface (API)) which securely communicates with the key management service 120 to perform various functions as described herein. For example, the key proxy module 116 implements methods that are configured to support the creation and assignment of key proxies for the client computing system 110 and/or the applications 112 that execute on the client computing system 110. In addition, the cryptography management system 114 implements methods that are configured to securely communicate with the key management service 120 to access data encryption and data decryption services provided by the key management service 120 on behalf of the applications 112. As explained below, the cryptography management system 114 is configured to establish a secure communications channel with the key management service 120 and pass cryptographic requests (e.g., data encryption requests or data decryption requests) received from the applications 112, along with key proxy information and plaintext data or encrypted data, to the key management service 120.

The key management service 120 implements methods that are configured to administer the full lifecycle of cryptographic keys that are used for encrypting and decrypting data of the client applications 112, and to protect the cryptographic keys from loss or unauthorized or malicious use. The key management service 120 securely maintains cryptographic keys in the secure key vault 140. The secure key vault 140 may reside in a local persistent storage that is directly connected to the computing system (e.g., server node) which hosts the key management service 120, or reside in a remote persistent storage of a remote key storage server that is network connected to the computing system which hosts the key management service 120. The key management service 120 implements various methods for supporting encryption/decryption services and generating and managing cryptographic keys as follows.

For example, the data encryption and decryption module 121 implements methods for encrypting data (e.g., translating plaintext data into ciphertext) and decrypting data (e.g., converting ciphertext back to plaintext). The data encryption and decryption module 121 can implement one or more of various types of cryptographic techniques. For example, in some embodiments, the data encryption and decryption module 121 implements a symmetric key cryptography system, wherein the same cryptographic key is utilized to both encrypt and decrypt the data. The cryptographic keys for the client applications 112 are securely maintained in the secure key vault 140, and retrieved and utilized by the key management service 120 to provide data encryption and decryption services to the client applications 112.

The key proxy generation and assignment module 122 implements methods that are configured to generate key proxies and assign key proxies to the client applications 112. In some embodiments, a key proxy is an algorithmically generated tag or identifier which is assigned to a given client application or client device, and which serves to uniquely identify a set of one or more cryptographic keys which are associated with the given client application or client device. In some embodiments, a key proxy is created in such a manner that it does not look like a standard cryptographic key. A key proxy is decorated differently than a typical cryptographic key (e.g., different headers, different mathematical characteristics, etc.) so that a hacker searching, e.g., the client computing system 110 or the data storage system 130 for cryptographic keys will be unlikely to find or identify a key proxy.

The key proxies for the client applications 112 are passed between the client cryptography management system 114 and the key management service 120, and are used by the key management service 120 to identify the cryptographic keys to be used for encrypting/decrypting data provided by the client applications 112. A key proxy essentially serves as a proxy in place of a cryptographic key such that the actual cryptographic keys associated with the key proxy remain stored in the secure key vault 140 and never passed to the client applications 112. In this regard, a key proxy is not used to encrypt or decrypt data, but rather a key proxy is utilized as a means for the key management service 120 to uniquely identify a set of one or more cryptographic keys which are associated with a given client application. As such, the use of key proxies abstracts the client applications 112 from knowledge of the actual cryptographic keys that are generated and utilized by the key management service 120 for providing cryptographic services to the client applications 112. In some embodiments, the key management service 120 implements key proxy assignment and management techniques as disclosed in U.S. patent application Ser. No. 16/175,356, filed on Oct. 30, 2018, entitled SECURE DISTRIBUTED STORAGE OF ENCRYPTION KEYS, which is commonly owned with the present application, and incorporated herein by reference.

The key generation and rotation module 123 implements methods that are configured to generate and rotate cryptographic keys, as well as perform other functions such as deleting, archiving, and revoking cryptographic keys, etc. For example, in some embodiments, the key generation and rotation module 123 implements symmetric cryptographic key generation techniques for algorithmically generating symmetric cryptographic keys (e.g., data encryption keys) using a cryptographically secure random bit generator which generates symmetric cryptographic keys that are unique and unpredictable. By way of example, in some embodiments, symmetric data encryption keys are generated using a 256-bit AES (Advanced Encryption Standard) algorithm. As is known in the art, 256-bit AES is an encryption standard that utilizes block ciphers e.g., AES-128, AES-192 and AES-256, to encrypt and decrypt data in blocks of 128 bits using cryptographic keys of size 128-bits, 192-bits and 256-bits, respectively. As explained in further detail below, the cryptographic keys and associated attributes (e.g., name, activation date, size, etc.) are stored in the secure key vault 140 in association with key proxies and generational indices.

In some embodiments, the key generation and rotation module 123 implements methods that are configured to generate key cryptographic keys that are used for encrypting and decrypting the cryptographic keys that are stored in the secure key vault 140. In such embodiments, the cryptographic keys can be stored in the secure key vault 140 in encrypted form so that the secure key vault 140 is protected even if a rogue actor is able to access the secure key vault 140 (e.g., by stealing a persistent storage device which comprises the secure key vault 140).

The key generation and rotation module 123 implements methods that are configured to rotate cryptographic keys that are maintained in the secure key vault 140 for the client applications 112. A key rotation process generally involves generating a new version of an existing cryptographic key upon the occurrence of predetermined event that mandates the rotation of the cryptographic key (referred to herein as "key rotation event") associated with a given client application and corresponding key proxy. The key rotation process results in the creation of new cryptographic key which is deemed a primary cryptographic key that is utilized to encrypt new data. When a rotation operation is performed, the new cryptographic key is generated and added to a set of one or more previously generated cryptographic keys associated with a given key proxy assigned to a given client application. When an initial cryptographic key is generated for a newly generated/assigned key proxy, the initial cryptographic key is deemed the primary version. Over time, the cryptographic keys can be rotated one or more times such that a given key proxy can be associated with two or more cryptographic keys. At any point in time, each key proxy has a designated primary cryptographic key which is used by the data encryption and decryption module 121, by default, to cryptographically process data of the given client application assigned to the key proxy. A key rotation process does not result in disabling or deleting previous versions of cryptographic keys, but rather the previous versions are deemed "expired" but remain available for decrypting data.

The key generation and rotation module 123 can be configured to rotate cryptographic keys in response to one or more different types of predefined key rotation events, which can vary depending on various factors with regard to security concerns and practices. For example, in some embodiments, a key rotation event is based on a predefined "regular rotation" schedule in which a cryptographic key for a given key proxy is change periodically to fulfill a key rotation mandate or a key expiration strategy or for other reasons. For example, a key rotation mandate could require that an encryption key be replaced with a new key after the lapse of a certain time interval (e.g., days, months, years, etc.). In this regard, the key generation and rotation module 123 can be configured for regular key rotation by allowing an administrator to set a rotation period which defines the time between when new key versions are generated automatically. The purpose of periodically rotating encryption keys as part of a regular rotation schedule is to, e.g., decrease the probability of a cryptographic key being broken, reduce the amount of data that is encrypted with a given cryptographic key so that the amount of data that can accessed by a given hacker using a compromised cryptographic key can be reduced.

In other embodiments, a key rotation event is based on an irregular, or ad-hoc rotation mandate, wherein key rotation can be performed by an administrator on demand when one or more cryptographic keys have been compromised or believed to have been compromised, etc. In addition, the key generation and rotation module 123 can be configured to control the revocation of keys, the deletion of keys, the mirroring of keys to a failover system, changing the attributes of the cryptographic keys, etc. A cryptographic key for a given key proxy which is no longer being used for supporting encryption and decryption requests, or which has been compromised, can be deleted from the secure key vault 140.

The generational index management module 124 implements methods that are configured to generate and manage generational indexes that are associated with key rotation operations. The generational index management module 124 operates in conjunction with the key rotation operations performed by the key generation and rotation module 123 to thereby create, sequence and maintain generational indexes when cryptographic keys are rotated. When the cryptographic key associated with a given key proxy is rotated, the generational index management module 124 will generate a new generational index tag to be associated with the new cryptographic key. In this manner, a given key proxy assigned to a given application can be mapped to a set of cryptographic keys, wherein the cryptographic keys associated with a given key proxy are uniquely distinguished by different time spans represented by the different generational indexes mapped to the different cryptographic keys.

The key proxy-to-cryptographic key mapping module 125 (alternatively "mapping module") implements methods that are configured to generate and maintain a mapping or otherwise associate key proxies to cryptographic keys. As cryptographic keys expire and new keys are generated as per the key rotation mandate(s), the mapping module 125 will add the associated generational indexes to the mapping information, such that a given key proxy can be mapped to multiple cryptographic keys which are, in turn, mapped to different generational indexes. This allows the key management service 120 to seamlessly support and fulfill a key rotation strategy without requiring the client applications 112 to have knowledge of the changes in cryptographic keys and obviates the need for any action to be taken by the client applications 112 due to the key rotations.

When objects are encrypted by the data encryption and decryption module 121, the encrypted data is associated with a key proxy tag and a generational index tag. When the encrypted data of a given client application needs to be decrypted, the key management service 120 utilizes the key proxy and generational index associated with the encrypted data to determine the cryptographic key that was used to encrypt the data, and then accesses such cryptographic key from the secure key vault 140 to decrypt the encrypted data.

For example, as shown in FIG. 1, the data storage system 130 stores encrypted data 150 of a given client application 112. The encrypted data 150 can be, for example, an encrypted file, an encrypted object, an encrypted data block, etc., which is utilized or otherwise managed by the given client application. The encrypted data 150 is associated with a key proxy tag 160T which identifies the key proxy assigned to the given client application. In addition, the encrypted data 150 is associated with a generational index tag 170T which identifies the generation of the cryptographic key (for the given key proxy) that was used to create the encrypted data 150. While only one instance of encrypted data 150 and associated tags 160T and 170T is shown in the data storage system 130 in FIG. 1 for ease of illustration, it is to be understood that the data storage system 130 would have multiple instances of encrypted data (and associated tags) for the same client application and other client applications.

Various techniques can be utilized to store the key proxy tags 160T and generational index tag 170T in association with the encrypted data 150. For example, the key proxy tag 160T and generational index tag 170T can be recorded as part of the metadata of the encrypted data 150. For example, the key proxy tag 160T and the generational index tag 170T can be recorded within an inode (index node) of a file containing the encrypted data 150. As is known in the art, an inode is a data structure that describes a file system object (e.g., file), wherein the inode stores attributes, metadata, and the disk block location(s) of the data associated with the object. In other embodiments, references to the key proxy and generational index tags 160T and 170T can be stored in a table that maps to one or more regions of disk storage where the encrypted data 150 is stored.

When data (e.g., object, file, etc.) is encrypted by the data encryption and decryption module 121 of the key management service 120, the data is decorated with the corresponding generational index in privately accessible object metadata. When the encrypted data is subsequently provided to the key management service 120 for decryption, the key management service 120 will utilize the associated key proxy provided by the client application in conjunction with the generational index associated with the encrypted data to retrieve the corresponding cryptographic key from the secure key vault 140 which is to be used for decrypting the encrypted data.

For example, as shown in FIG. 1, the secure key vault 140 stores a set of one or more cryptographic keys 180 that are associated with a given key proxy 160 assigned to a given one of the client applications 112. In the illustrative embodiment of FIG. 1, the set of cryptographic keys 180 comprises a plurality (n) of cryptographic keys 180-1, . . . , 180-$n$, which are in turn are associated with respective generational indexes 170-1, . . . 170-$n$ (collectively, generational indexes 170). In this exemplary embodiment, the generational index 170-1 which maps to the cryptographic key 180-1 can represent a first (initial) generation of the cryptographic key, wherein the cryptographic key 180-1 comprises the first cryptographic key that was generated for the given key proxy 160 when the key proxy 160 was initially generated and assigned to a given client application. The generational index 170-$n$ which maps to the cryptographic key 180-$n$ represents the current generation of the cryptographic key associated with the key proxy 160, such that the cryptographic key 180-$n$ represents the primary (default) cryptographic key that is used to encrypt data for the given application associated with the key proxy 180.

While only one key proxy 160 and associated generational indexes 170 and cryptographic keys 180 are shown in the secure key vault 140 for ease of illustration, it is to be understood that the secure key vault 140 would have multiple sets of cryptographic keys that are associated with multiple key proxies for different client application and/or client devices. For purposes of illustration and explanation, it can be assumed that the key proxy tag 160T (associated with the encrypted data 150 in the data storage system 130) corresponds to the key proxy 160 in the secure key vault 140, and that the generational index tag 170T corresponds to one of the generational indexes 170 that are mapped to the key proxy 160 in the secure key vault 140. In this instance, when the encrypted data 150 is sent from the client cryptography management system 114 to the key management service 120 to be decrypted, the key management service 120 will utilize the key proxy tag 160T to map to the corresponding key proxy 160, and utilize the generational index tag 170T to map to a corresponding one of the generational indexes 170 to thereby identify and retrieve one of the cryptographic keys 180 to decrypt the encrypted data 150.

In some embodiments, the key proxies are mapped or otherwise associated with respective client identifiers, wherein the client identifiers comprise known valid credentials of one or more of the client computing system 110, the client applications 112 and/or the client cryptography management system 114, which are deemed to be properly associated with the key proxies. For example, as shown in FIG. 1, a client identifier 165 is mapped to the key proxy 160. When the key management service 120 accesses the secure key vault 140 to obtain one of the a cryptographic keys 180 associated with the key proxy 160, the key management service 120 can compare credentials received by a requesting client application or device against the client identifier 165 to determine if the credentials match or otherwise correspond to the client identifier 165.

In some embodiments, the cryptographic keys 180 are stored in the secure key vault 140 in encrypted form so that the secure key vault 140 is protected even if a rogue actor is able to access the secure key vault 140 (e.g., by stealing the persistent storage device on which the secure key vault 140 is stored). In some embodiments, the key proxies and/or client identifiers are stored in the secure key vault 140, either in encrypted or plaintext format. In other embodiments, one or both of the key proxy 160/or client identifier 165 are not directly stored in the secure key vault 140. Instead, the associations are encoded by choosing a key with which to encode the stored cryptographic keys 180 such that the encoded cryptographic key for a particular key is derivable from the associated key proxy 160 and/or the client identifier 165. In some embodiments, multiple client identifiers may be associated with a given key proxy such that different client devices and/or client applications may have their data encrypted using the same cryptographic key(s) associated with the given key proxy.

Figure 2:
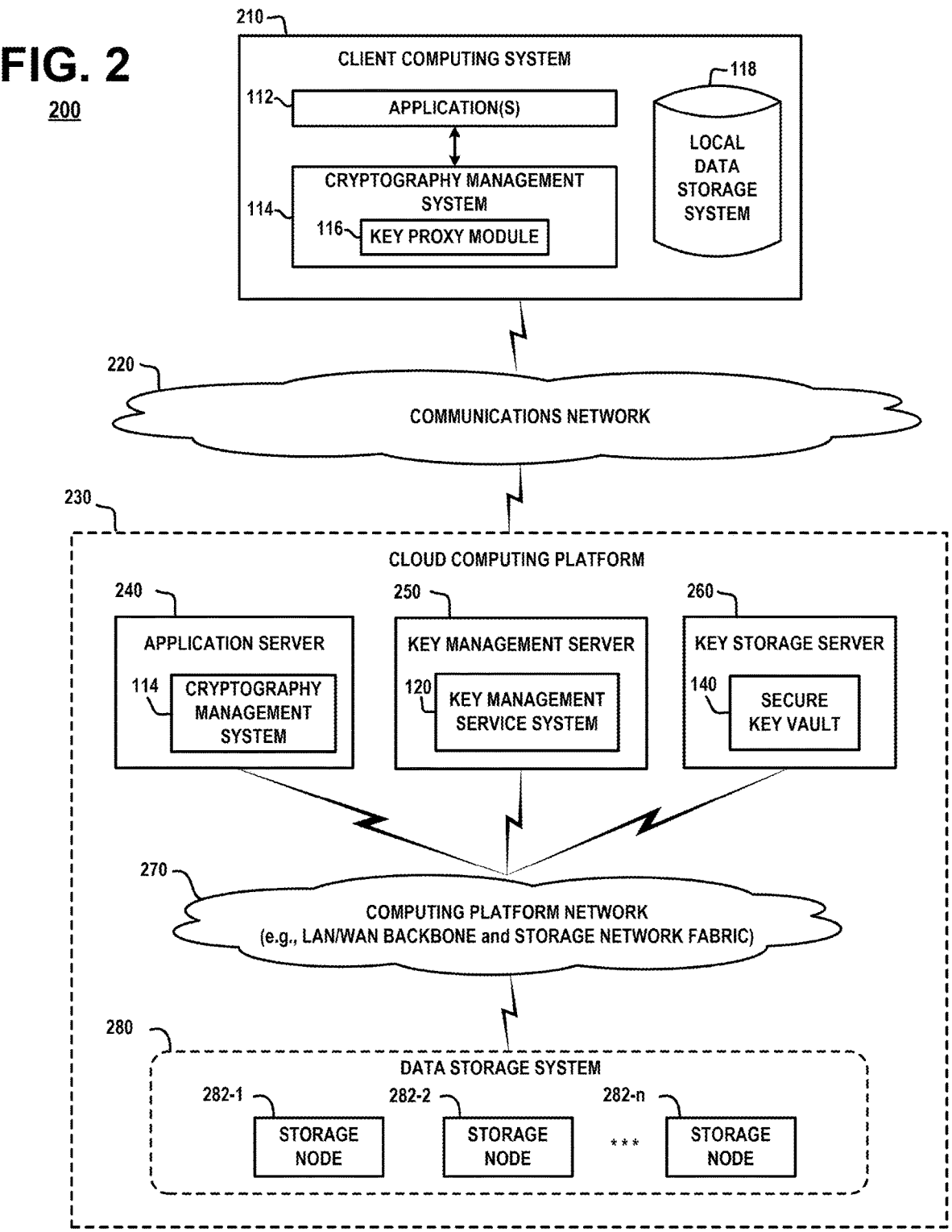
FIG. 2 is a high-level schematic illustration of a cloud computing system which implements a cryptographic key management service according to an exemplary embodiment of the disclosure.

FIG. 2 is a high-level schematic illustration of a cloud computing system 200 which implements a cryptographic key management service according to an exemplary embodiment of the disclosure. In particular, FIG. 2 illustrates an exemplary embodiment of the system of FIG. 1 implemented in the context of a cloud computing system and/or a distributed storage system. The system 200 comprises a client computing system 210, a communications network 220, and a cloud computing platform 230. Similar to the client computing system 110 of FIG. 1, the client computing system 210 comprises one or more applications 112, and a cryptography management system 114 which comprises a key proxy module 116. In addition, the client computing system 210 comprises a local data storage system 118 (e.g., HDD, SSD, etc.).

The cloud computing platform 230 is accessible by the client computing system 210 over the communications network 220. While the communications network 220 is generically depicted in FIG. 2, it is to be understood that the communications network 220 may comprise any known communication network such as, a global computer network (e.g., the Internet), a wide area network (WAN), a local area network (LAN), a satellite network, a telephone or cable network, a cellular network, a wireless network such as Wi-Fi or WiMAX, or various portions or combinations of these and other types of networks. The term "network" as used herein is therefore intended to be broadly construed so as to encompass a wide variety of different network arrangements, including combinations of multiple networks possibly of different types. In this regard, in some embodiments, the communications network 220 comprises combinations of multiple different types of communications networks each comprising network devices configured to communicate using Internet Protocol (IP) or other related communication protocols. The communications network 220 comprises intermediate points (such as routers, switches, etc.) and other elements (e.g., gateways) that form a network backbone to establish communication paths and enable communication between network endpoints.

The cloud computing platform 230 comprises at least one application server 240, a key management server 250, a key storage server 260, a computing platform network 270, and a distributed data storage system 280. The application server 240 hosts a cryptography management system 114. The key management server 250 hosts a key management service system 120. The key storage server 260 hosts and maintains a secure key vault 140. The distributed data storage system 280 comprises a plurality of data storage nodes 282-1, 282-2, . . . , 282-n (collectively, data storage nodes 282).

The data storage system 280 can be implemented using any suitable data storage system, or combination of data storage systems, including, but not limited to storage area network (SAN) systems, Hadoop Distributed File System (HDFS), system, as well as other types of data storage systems comprising clustered or distributed virtual and/or physical infrastructure. In some embodiments, the data storage nodes 282 comprise storage appliances with memory controllers, processors, cache memory, and non-volatile storage media to provide persistent storage resources for the application server 240 and other computing nodes of the cloud computing platform 230. The data storage devices of the data storage nodes 282 may include one or more different types of persistent storage devices, or data storage arrays, such as hard disk drives or solid-state drives, or other types and combinations of non-volatile memory. In one embodiment, the data storage nodes 282 are implemented using, for example, an enterprise-class storage platform comprising high-performance, scalable storage arrays, which can be implemented for hyper-scale computing systems.

The computing platform network 270 is configured to enable peer-to-peer communication between the servers 240, 250, and 260 within the cloud computing platform 230, as well as enable network access by the servers 240, 250, and 260 to the distributed data storage system 280 and peer-to-peer communication between the data storage nodes 282 of the distributed data storage system 280. Depending on the network distribution and geographic location of the constituent components and nodes of the cloud computing platform 230, the computing platform network 270 may comprise, for example, a LAN, a WAN, or a combination of one or more LANs and WANs, as well as other types of communication networks that are commonly used to implement cloud computing systems. In addition, the computing platform network 270 comprises a storage network fabric to enable shared access by the servers 240, 250 and 260 to the data storage system 280 and to enable communication between the storage nodes 282. In some embodiments, the computing platform network 270 comprises a converged framework such as a converged Ethernet framework.

In one embodiment, the cloud computing platform 230 performs data processing, data storage, and data management functions to support one or more network or web-based applications or services and/or other types of high performance computing (HPC) applications such as deep learning applications, machine learning, big data analytics, or other types of HPC applications that are typically implemented using a public cloud-based service system to deliver consumer or business applications and services to multiple end users, service providers, and/or organizations. In other embodiments, the cloud computing platform 230 comprises a private cloud platform that is accessible by a single organization, for example. The application server 240 is configured to host and manage one or more applications, which are used by multiple, simultaneously connected users and/or entities in one or more application domains. Depending on the implementation of the cloud computing platform 230, the application server 240 is configured to, e.g., execute business logic, execute scripts and services to query databases, and perform other computing functions that are needed to deliver the cloud-based applications and services provided by the cloud computing platform 230. In some embodiments, the servers 240, 250 and 260 and the constituent system components of the cloud computing platform 230 are implemented using (i) a cluster of servers that reside in a single facility (e.g., data center facility of private company) or (ii) a cluster of servers that reside in two or more data center facilities or remote locations (distributed over a cloud network) of a given service provider, for example.

The cryptographic management systems 114 that execute on the client computing system 210 and the application server 240 implement the same or similar functions as discussed above in conjunction with FIG. 1, the details of which will not be repeated. The cryptography management system 114 which executes on the client computing system 210 is configured to securely communicate with the key management service 120 (hosted by the key management server 250) to access data encryption and data decryption services provided by the key management service 120 on behalf of the local applications 112 that execute on the client computing system 210. The applications 112 on the client computing system 210 can store data "locally" in the local data storage system 118 and/or "in the cloud" in the data storage system 280 of the cloud computing platform. On the other hand, the cryptography management system 114 which executes on the application server 240 is configured to securely communicate with the key management service 120 (hosted by the key management server 250) to access data encryption and data decryption services provided by the key management service 120 on behalf of the applications that are hosted by the application server 240 and other compute nodes of the cloud computing platform 230. The key management server 250 comprises a key management service system 120 which implements the same or similar functions as discussed above in conjunction with FIG. 1, the details of which will not be repeated. The key storage server 260 comprises a secure key vault 140 which implements the same or similar functions as discussed above in conjunction with FIG. 1, the details of which will not be repeated.

Figure 3:
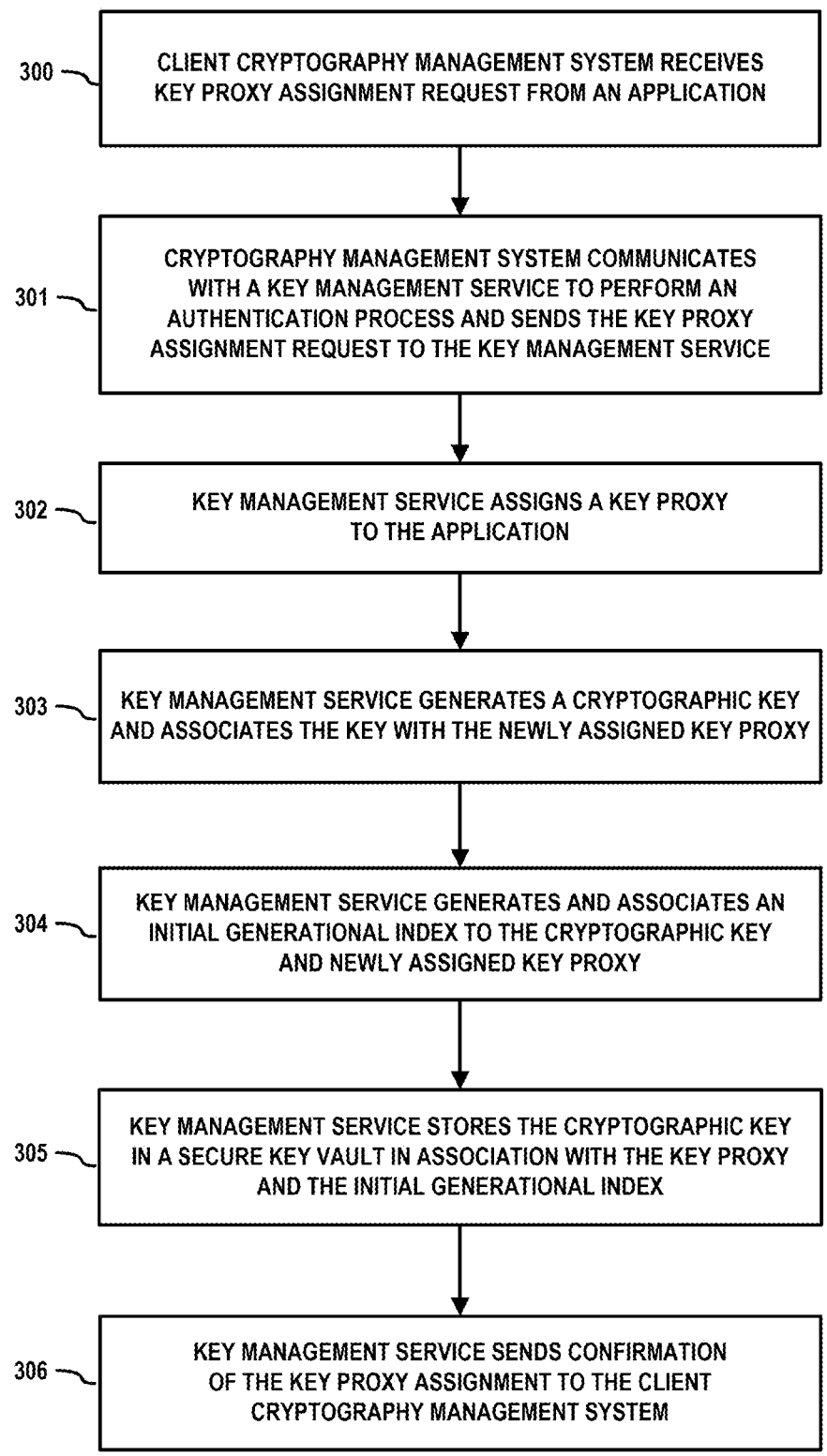
FIG. 3 is a flow diagram of method for key proxy assignment according to an embodiment of the disclosure.

FIG. 3 is a flow diagram of method for key proxy assignment according to an embodiment of the disclosure. In particular, FIG. 3 is a flow diagram of a method for assigning a key proxy and associated cryptographic key to a client. For illustrative purposes, the process flow of FIG. 3 will be discussed in conjunction with the exemplary embodiments of FIGS. 1 and 2. Referring to FIG. 3, a client cryptography management system 114 receives a key proxy assignment request from a given application executing on, e.g., a client device or application server (block 300). In some embodiments, the key proxy assignment can be requested by the application during an initial registration process wherein the application registers with the client cryptography management system 114 to obtain data encryption/decryption management services. In other embodiments, the key proxy assignment can be requested by the application when the application requires data encryption/decryption services for the first time subsequent to the initial registration process.

In response to the key proxy assignment request received from the application, the cryptography management system 114 communicates with a key management service 120 to perform an authentication process and sends the key proxy assignment request to the key management service 120 (block 301). For example, in some embodiments, the authentication process is performed to authenticate credentials of the requesting application, the client cryptography management system 114, and/or the key management service 120. In response to verification of the credentials, a secure communications channel is established between the client cryptography management system 114 and the key management service 120. The client cryptography management system 114 sends the key proxy assignment request to the key management service 120 over the secure communications channel.

More specifically, in some embodiments, an authentication process comprises the client cryptography management system 114 sending credentials to the key management service 120 for verification, wherein the credentials include one or more of (i) credentials of the client computing system, (ii) credentials of the requesting user/application, and/or (iii) credentials of the particular instance of the client cryptography management system 114 running on the client computing system. In addition, the key management service 120 can send its credentials to the client cryptography management system 114 for verification. In some embodiments, sending credentials includes generating a digital signature by signing a known message with a private key that is preassigned to, e.g., the client cryptography management system 114 or the client computing system 110, wherein the key management service 120 can then verify the digital signature using a paired public key that is published for client cryptography management system 114 or the client computing system 110. The authentication process is performed to provide security against spoof attacks that can be perpetrated by a hacker. The authentication process can be performed using any suitable PKI (public key infrastructure) authentication process such as verification of certificates using a CA (certificate authority). Following authentication, a secure channel is established between the client cryptography management system 114 and the key management service 120 using a protocol such as, Transport Layer Security (TLS), Secure Shell (SSH), or similar protocols or known key exchange or key agreement protocols.

In some embodiments, the key proxy module 116 of the client cryptography management system 114 generates a key proxy for the requesting application and sends the pre-generated key proxy to the key management service 120 as part of the key proxy assignment request. In response to the key proxy assignment request, the key management service 120 assigns a key proxy to the application (block 302). In some embodiments, the newly assigned key proxy comprises the pre-generated key proxy included with the key proxy assignment request. In other embodiments, when the client cryptography system 114 does not generate a key proxy and sends a key proxy assignment request with no key proxy, the key management service 120 generates a new key proxy and assigns the newly generated key proxy to the requesting application via the key proxy generation and assignment module 122 (FIG. 1).

The key management service 120 generates a cryptographic key for the application and associates the cryptographic key with the newly assigned key proxy (block 303). For example, in some embodiments, the newly generated cryptographic key comprises a symmetric cryptographic key to be used for encrypting and decrypting data associated with the requesting application. In addition, the key management service 120 generates and associates an initial generational index to the cryptographic key and the newly assigned key proxy (block 304). The key management service 120 stores the generated cryptographic key in a secure key vault in association with the newly assigned key proxy and the initial generational index (block 305). In some embodiments, the client credentials (e.g., client identifier 165, FIG. 1), which were received by the key management service 120 and utilized in the authentication process, are also associated with the newly assigned key proxy.

In some embodiments, the key management service 120 stores the cryptographic key in a secure key vault that resides in a local persistent storage of the computing system (e.g., server) which hosts the key management service 120. In other embodiments, the key management service 120 stores the cryptographic key in a remote secure key vault that resides in a remote persistent storage of a remote key storage server. In this instance, the key management service 120 sends the cryptographic key and associated information (e.g., key proxy, generational index, client identifier, etc.) to the remote key storage server over a secured communications channel to protect against eavesdropping. In some embodiments, the cryptographic key is encrypted using a key encryption key and stored in the secure key vault (local or remote) in encrypted form. The key encryption key can be generated using, e.g., the associated key proxy and/or client credentials using known techniques.

The key management service 120 sends an assignment confirmation to the client cryptography management system 114 to confirm that a key proxy has been successfully assigned to the requesting application and associated with a cryptographic key (block 306). In embodiments where the key management service 120 generates a key proxy for the requesting application, the assignment confirmation that is sent to the to the client cryptography management system 114 will also include the key proxy assigned to the requesting application. In embodiments wherein the client cryptography management system 114 generates the key proxy, the assignment confirmation from the key management service 120 provides conformation that the pre-generated key proxy has been successfully assigned to the requesting application and associated with a cryptographic key In some embodiments, the assignment confirmation is sent over the secure communications channel. While the confirmation message provides notification to the client cryptographic management system 114 that a cryptographic key has been created and stored in a secure key vault in association with the newly assigned key proxy, as noted above, the key management service 120 does not provide the actual cryptographic key or key value to the client cryptography management system 114.

As noted above, the key management service 120 is responsible for managing cryptographic keys, which includes utilizing key rotation techniques to change cryptographic keys periodically to comply with a key rotation mandate or key expiration strategy, or changing keys for other reasons such as, e.g., a key being compromised, etc. For example, in some embodiments, a cryptographic key rotation mandate may be specified which requires that a cryptographic key be replaced with a new cryptographic key after the lapse of a certain time interval (e.g., months, years, etc.). The key management server 120 is configured to perform a key rotation on behalf of a client application while continuing to abstract the client application from having to deal with the encryption key change and any associated burdens.

Figure 4:
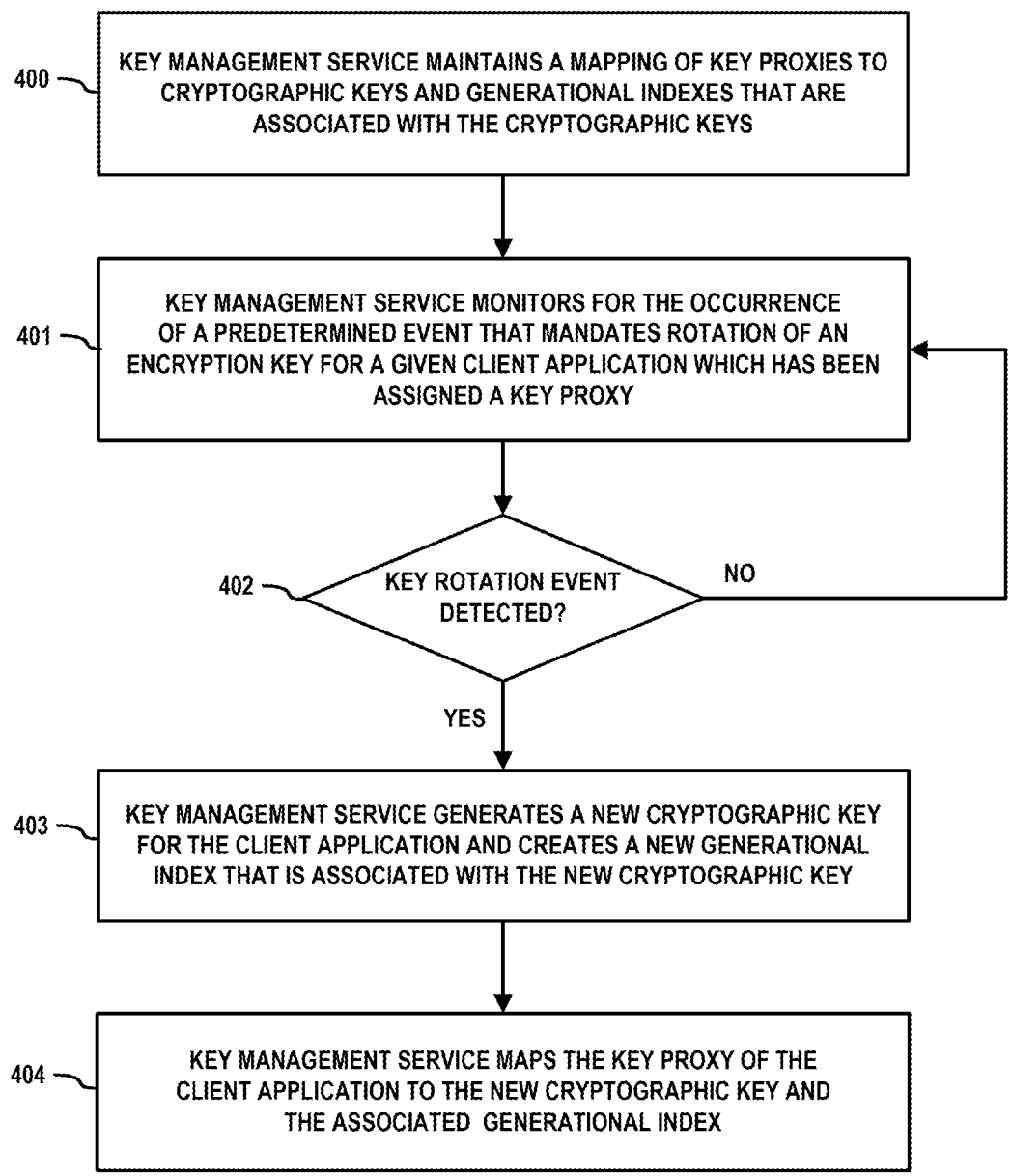
FIG. 4 is a flow diagram of a method for rotating cryptographic keys and assigning generational indexes according to an exemplary embodiment of the disclosure.

For example, FIG. 4 is a flow diagram of a method for rotating cryptographic keys and assigning generational indexes according to an exemplary embodiment of the disclosure. As noted above, the key management service 120 maintains a mapping of key proxies (which are assigned to client applications) to cryptographic keys that are stored in a secure key vault and generational indexes that are associated with the cryptographic keys (block 400). The key management service 120 will monitor for the occurrence of a predetermined event (key rotation event) that mandates the rotation of an encryption key for a given client application which has been assigned a key proxy (block 401). As noted above, a key rotation event may be the expiration of a current cryptographic key upon the lapse of a predefined time interval from the time when the most current cryptographic key was activated.

In response to detecting the occurrence of a key rotation event for the given client application (affirmative determination in block 402), the key management service 120 will generate a new cryptographic key for the client application and creates a new generational index that corresponds to the new cryptographic key (block 403). The key management service 120 then maps the existing key proxy of the given client application to the new cryptographic key and the associate generational index (block 404). The new cryptographic key is designated as the primary cryptographic key that is used to encrypt new data.

As subsequent key rotation events are detected and cryptographic keys expire for a given application, the key management service 120 will map the existing key proxy of the given application to new cryptographic keys that are been generated for the given application over time, and the key management service 120 will add new generational indexes to such mapping so that the same key proxy maps to the cryptographic keys and associated generational indexes that correspond to different generational spans. As noted above, when data is encrypted (e.g., objects, files, data blocks, etc.), the encrypted data is decorated with its corresponding generational index in privately accessible metadata. The key management service 120 uses the client supplied key proxy in conjunction with the generational index of the encrypted data to determine the actual cryptographic key to be used for the decryption. If the generational index of the encrypted data corresponds to a cryptographic key that has expired, the key management service 120 will utilize the expired cryptographic key to decrypt the data, but then update generational index of the data object to correspond to the current generation and re-encrypt the data object. In this manner, the key management service 120 can seamlessly support and fulfill a key rotation strategy without requiring the client application to have knowledge of changes in cryptographic keys while obviating the need for the client application to take any action due to the changes in cryptographic keys.

Figure 5:
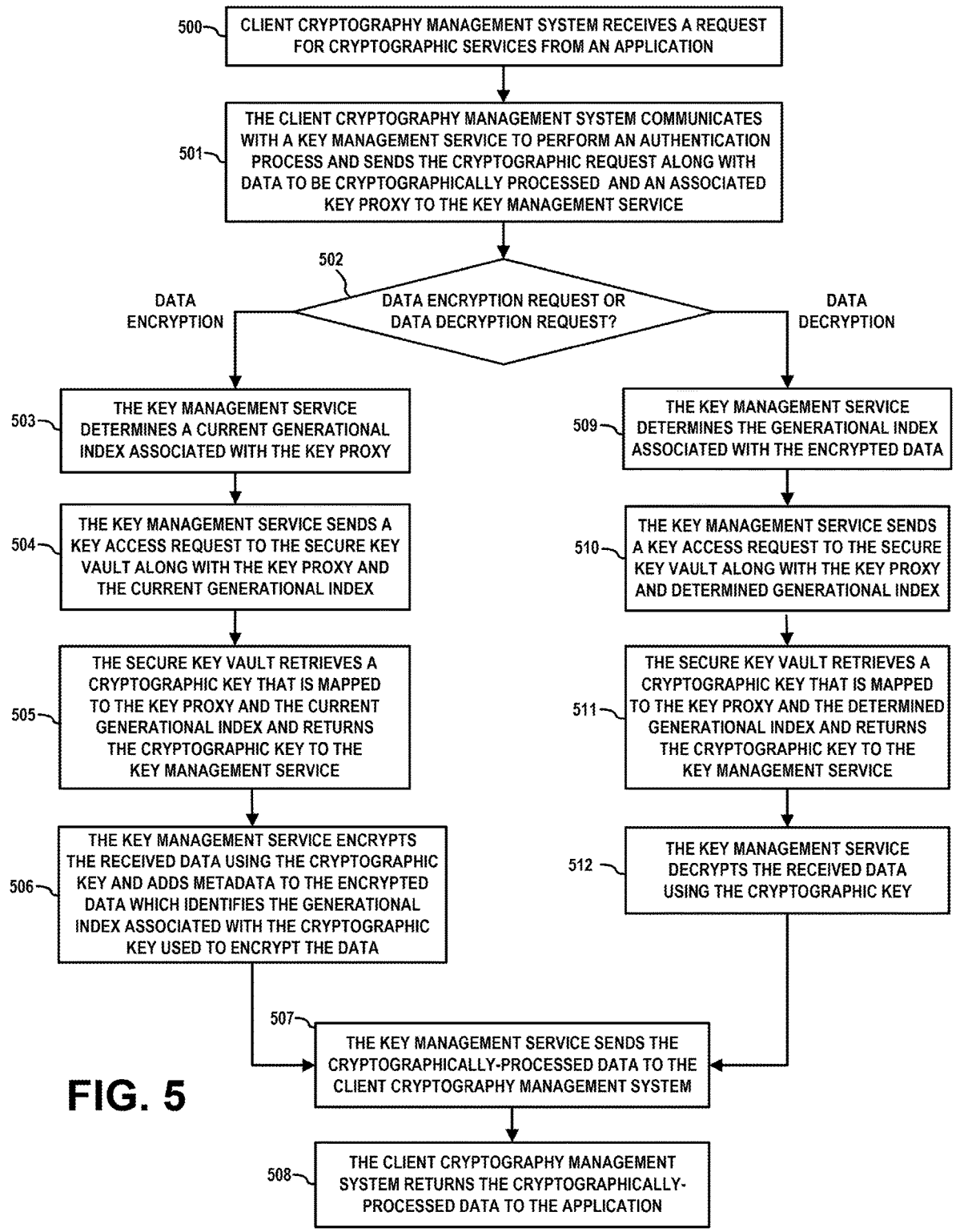
FIG. 5 is a flow diagram of a method for cryptographically processing data using key proxies and generational indexes according to an exemplary embodiment of the disclosure.

FIG. 5 is a flow diagram of a method for cryptographically processing data using key proxies and generational indexes according to an exemplary embodiment of the disclosure. For illustrative purposes, the process flow of FIG. 5 will be discussed in conjunction with the exemplary embodiments of FIGS. 1 and 2. Referring to FIG. 5, a client cryptography management system 114 receives a cryptographic request for cryptographic services from a given application executing on, e.g., a client device or application server (block 500). For example, the given application may have accessed encrypted data from a storage system (e.g., the local data storage 118, the data storage system 280, FIG. 2) and needs to have the data decrypted. In this instance, the cryptographic request comprises a data decryption request which includes the encrypted data and the key proxy associated with the application. By way of further example, the given application may have data which the application wants to have encrypted and stored in a data storage system (e.g., the local data storage 118, the data storage system 280, FIG. 2) in encrypted form. In this instance, the cryptographic request comprises a data encryption request which includes the data to be encrypted and the key proxy associated with the application.

In response to the cryptographic request received from the application, the cryptography management system 114 communicates with a key management service 120 to perform an authentication process and sends the cryptographic request along with the data (e.g., encrypted data or plaintext data) to be cryptographically processed and the associated key proxy to the key management service 120 (block 501). For example, in some embodiments, the authentication process is performed to authenticate credentials of the requesting application, the client cryptography management system 114, and/or the key management service 120, using the same or similar authentication methods as discussed above. In response to verification of the credentials, a secure communications channel is established between the client cryptography management system 114 and the key management service 120. The client cryptography management system 114 sends the cryptographic request along with the data (e.g., plaintext or encrypted data) to be cryptographically processed and the associated key proxy to the key management service 120 over the secure communications channel.

In response to receiving the cryptographic request, the key management service 120 determines whether the cryptographic request comprises a data encryption request or a data decryption request (block 502). If the cryptographic request comprises a data encryption request, the key management service 120 will determine a current generational index associated with the key proxy (block 503). In this instance, the data (e.g., plaintext or encrypted data) will be encrypted using a primary (or default) cryptographic key that is mapped to the current generational index associated with the key proxy. The key management service 120 will send a key access request to the secure key vault 140 (which resides locally or remotely) along with the key proxy and the current generational index (block 504). The secure key vault 140 will retrieve a stored cryptographic key that is mapped to the key proxy and the current generational index, and return the cryptographic key to the key management service 120 (block 505). In some embodiments, the key management service 120 sends the credentials used in the authentication process to the secure key vault 140 as part of the key access request, wherein the key retrieval process will utilize the credentials to confirm that the key proxy is mapped to a client identifier associated with such credentials.

The key management service 120 then proceeds with cryptographic processing of the received data by utilizing the retrieved cryptographic key to encrypt the received data, and adding metadata to the encrypted data (or otherwise associating metadata with the encrypted data) which identifies the generational index associated with the cryptographic key used to encrypt the data (block 506). In this instance, the retrieved cryptographic key will be the primary (e.g., default) cryptographic key associated with the current generational index. In some embodiments, when the cryptographic key is encrypted, the cryptographic processing comprises decrypting the cryptographic key using an associated key decryption key.

The key management service 120 then proceeds to send the cryptographically-processed data (e.g., encrypted data) back to the client cryptography management system 114 as a response to the previously received cryptographic request (block 507). In turn, the client cryptography management system 114 returns the cryptographically-processed data (e.g., encrypted data) to the client application as a response to the previously received cryptographic request (block 508). The application (e.g., client application or application server) can store the encrypted data in a local or remote data storage system (and possibly further encrypt the encrypted data to implement multi-layer encryption). For example, as shown in FIG. 1, and as discussed above, encrypted data 150 (e.g., file or object, etc.) can be stored in the data storage system 130 in association with the corresponding key proxy tag 160T and generational index tag 170T.

Referring back to block 502, if the cryptographic request comprises a data decryption request, the key management service 120 will determine or otherwise identify the generational index associated with the encrypted data that was received for processing (block 509). In some embodiments, the generational index comprises a tag that is included as metadata within or associated with the encrypted data, wherein the key management system 120 (e.g., the generational index management module 124) can extract the generational index tag from the encrypted data. The key management service 120 will send a key access request to the secure key vault 140 (which resides locally or remotely) along with the key proxy and the determined generational index (block 510). The secure key vault 140 will retrieve a stored cryptographic key that is mapped to the key proxy and the determined generational index and return the cryptographic key to the key management service 120 (block 511). In some embodiments, the key management service 120 sends the credentials used in the authentication process to the secure key vault 140 as part of the key access request, wherein the key retrieval process will utilize the credentials to confirm that the key proxy is mapped to a client identifier associated with such credentials (e.g., compare the credentials to the client identifier 165, FIG. 1).

The key management service 120 then proceeds with cryptographic processing of the received data by utilizing the retrieved cryptographic key to decrypt the received data and generate decrypted data (block 512). In this instance, the retrieved cryptographic key can be a primary (e.g., default) cryptographic key associated with the determined (e.g., current) generational index, or an expired cryptographic key associated with a previous generational index. As noted above, if the decrypted data is subsequently re-encrypted, the key management system 120 will utilize the primary (e.g., default) cryptographic key associated with the current generational index to re-encrypt the decrypted data (and not re-use the expired cryptographic key). In some embodiments, when the cryptographic key is encrypted, the cryptographic processing comprises decrypting the cryptographic key using an associated key decryption key.

The key management service 120 then proceeds to send the cryptographically-processed data (e.g., decrypted data) back to the client cryptography management system 114 as a response to the previously received cryptographic request (block 507). In turn, the client cryptography management system 114 returns the cryptographically-processed data (e.g., decrypted data) to the application as a response to the previously received cryptographic request (block 508). The application (e.g., client application or application server) can process the decrypted data as needed.

Figure 6:
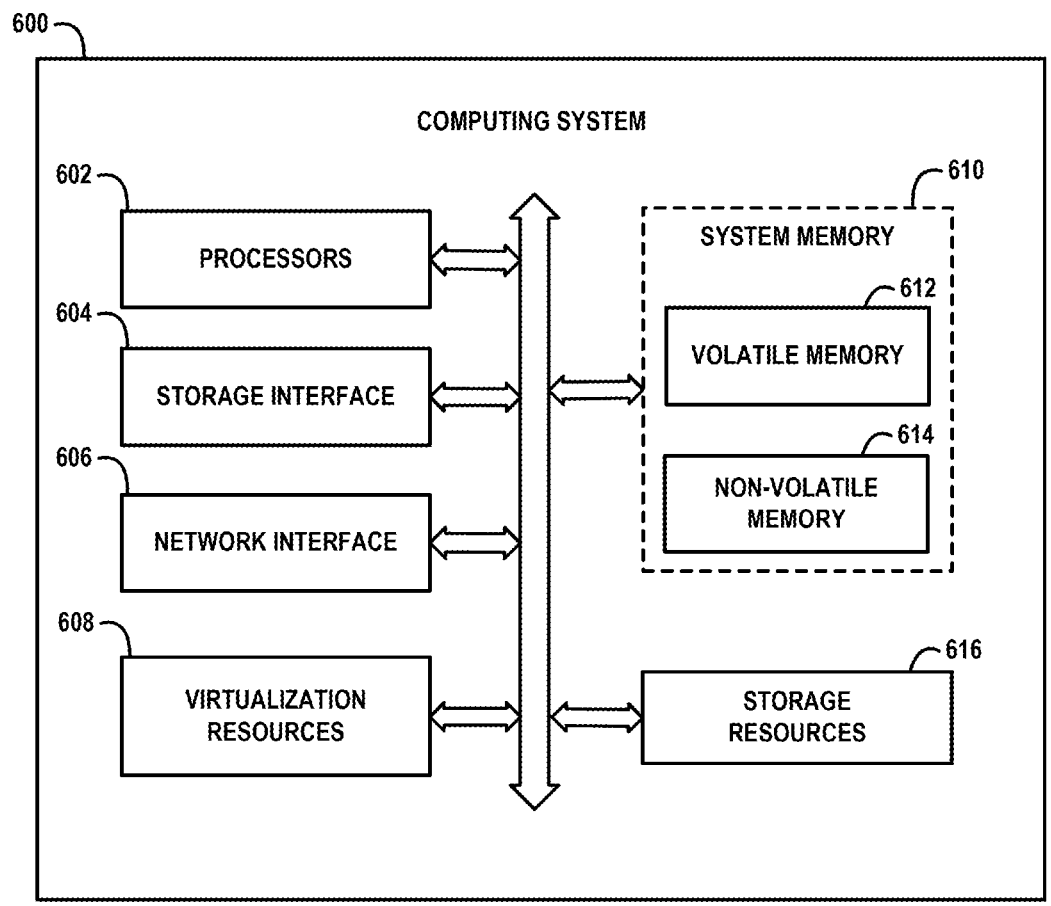
FIG. 6 schematically illustrates framework of a computing system which can be implemented for hosting a cryptographic key management service according to an exemplary embodiment of the disclosure.

FIG. 6 schematically illustrates framework of a computing system 600 which can be implemented for hosting a cryptographic key management service according to an exemplary embodiment of the disclosure. More specifically, in some embodiments, FIG. 6 illustrates an exemplary framework of: (i) the client computing system 110 of FIG. 1 which hosts a cryptography management system 114; (ii) the application server 240 of FIG. 2 which hosts a cryptography management system 114; and/or (iii) the key management server 250 of FIG. 2 which hosts the key management service system 120. The computing system 600 comprises processors 602, storage interface circuitry 604, network interface circuitry 606, virtualization resources 608, system memory 610, and storage resources 616. The system memory 610 comprises volatile memory 612 and non-volatile memory 614.

The processors 602 comprise one or more types of hardware processors that are configured to process program instructions and data to execute a native operating system (OS) and applications that run on the computing system 600. For example, the processors 602 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligent (AI) accelerators, and other types of specialized processors or coprocessors that are configured to execute one or more fixed functions.

The storage interface circuitry 604 enables the processors 602 to interface and communicate with the system memory 610, the storage resources 616, and other local storage and off-infrastructure storage media, using one or more standard communication and/or storage control protocols to read data from or write data to volatile and non-volatile memory/storage devices. Such protocols include, but are not limited to, non-volatile memory express (NVMe), peripheral component interconnect express (PCIe), Parallel ATA (PATA), Serial ATA (SATA), Serial Attached SCSI (SAS), Fibre Channel, etc. The network interface circuitry 606 enables the computing system 600 to interface and communicate with a network and other system components. The network interface circuitry 606 comprises network controllers such as network cards and resources (e.g., network interface controllers (NICs) (e.g. SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 608 can be instantiated to execute one or more applications or functions which are hosted by the computing system 600. For example, the virtualization resources 608 can be configured to implement various modules and functionalities of a cryptography management system 114 or key management service 120 as discussed herein. In one embodiment, the virtualization resources 608 comprise virtual machines that are implemented using a hypervisor platform which executes on the computing system 600, wherein one or more virtual machines can be instantiated to execute functions of the computing system 600. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the computing system 600, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. An example of a commercially available hypervisor platform that may be used to implement one or more of the virtual machines in one or more embodiments of the disclosure is the VMware® vSphere™ which may have an associated virtual infrastructure management system such as the VMware® vCenter™. The underlying physical infrastructure may comprise one or more commercially available distributed processing platforms which are suitable for the target application.

In another embodiment, the virtualization resources 608 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the computing system 600 as well as various modules and functionalities of a cryptography management system 114 or key management service 120 as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

In one embodiment, the various modules of the cryptography management system 114 and the key management service 120 as shown in FIG. 1 comprise program code that is loaded into the system memory 610 (e.g., volatile memory 612), and executed by the processors 602 to perform respective functions as described herein. In this regard, the system memory 610, the storage resources 616, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 610 comprises various types of memory such as volatile RAM, NVRAM, or other types of memory, in any combination. The volatile memory 612 may be a dynamic random-access memory (DRAM) (e.g., DRAM DIMM (Dual In-line Memory Module), or other forms of volatile RAM. The non-volatile memory 614 may comprise one or more of a NAND Flash storage device, a SSD device, or other types of next generation non-volatile memory (NGNVM) devices. The system memory 610 can be implemented using a hierarchical memory tier structure wherein the volatile system memory 612 is configured as the highest-level memory tier, and the non-volatile system memory 614 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 602 to execute a native operating system and one or more applications or processes hosted by the computing system 600, and to temporarily store data that is utilized and/or generated by the native OS and application programs and processes running on the computing system 600. The storage resources 616 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:
   receiving, by a key management service executing on a first computing system, a data decryption request from a client application executing on a second computing system, wherein the data decryption request comprises encrypted data, a generational index associated with the encrypted data, and a key proxy assigned to the client application, wherein the key proxy comprises a unique identifier of a set of one or more cryptographic keys associated with the key proxy assigned to the client application;
   determining, by the key management service, the generational index associated with the encrypted data, wherein the generational index identifies a generation of a given cryptographic key which is included in the set of one or more cryptographic keys associated with the key proxy and which was used to create the encrypted data;
   obtaining, by the key management service, the generation of the cryptographic key from a secure key vault, which is mapped to the received key proxy and the determined generational index;
   decrypting, by the key management service, the encrypted data using the obtained cryptographic key to generate decrypted data; and
   sending, by the key management service, the decrypted data to the client application.

2. The method of claim 1, wherein the key proxy comprises a key proxy tag that is stored as metadata in association with the encrypted data.

3. The method of claim 1, wherein:
   the generational index comprises a generational index tag that is stored as metadata in association with the encrypted data; and
   the key management service extracts the generational index tag from the metadata of the encrypted data to determine the generational index associated with the encrypted data.

4. The method of claim 1, comprising:
   receiving, by the key management service, credentials of the client application;
   authenticating, by the key management service, the client application using the received credentials; and
   initiating, by the key management service, a secure communications channel between the first and second computing systems in response to the client application being authenticated;
   wherein the data decryption request is received by the key management service over the secure communications channel; and
   wherein the decrypted data is sent by the key management service to the client application over the secure communications channel.

5. The method of claim 4, wherein authenticating the client application using the received credentials, comprises:
   comparing, by the key management service, the received credentials of the client application to a client identifier associated with the received key proxy to determine whether the received credentials match the client identifier associated with the received proxy; and
   authenticating the client application, in response to determining that the received credentials match the client identifier associated with the received key proxy.

6. The method of claim 1, comprising:
   receiving, by the key management service, a data encryption request from the client application, wherein the data encryption request comprises data to be encrypted and the key proxy assigned to the client application;
   determining, by the key management service, a current generational index associated with the key proxy, wherein the current generational index identifies a primary version of a cryptographic key which is associated with the key proxy and which is used, by default, to encrypt the data received from the client application;
   obtaining, by the key management service, the primary version of the cryptographic key from the secure key vault, which is mapped to the received key proxy and the current generational index;
   encrypting, by the key management service, the received data using the obtained cryptographic key to generate encrypted data; and
   sending, by the key management service, the encrypted data to the client application.

7. The method of claim 1, comprising:
   receiving, by the key management service, a key proxy assignment request from a second client application;
   assigning, by the key management service, a key proxy to the second client application;
   generating, by the key management service, a new cryptographic key for the second client application; and
   storing, by the key management service, the new cryptographic key in the secure key vault in association with the assigned key proxy and an initial generational index.

8. The method of claim 7, wherein assigning, by the key management service, the key proxy to the second client application comprises:

generating, by the key management service, a key proxy for the second client application; and sending, by the key management service, the generated key proxy to the second client application.

9. The method of claim 1, comprising:

monitoring, by the key management service, for the occurrence of a predetermined event that mandates rotation of a current cryptographic key associated with the key proxy assigned to the client application;

in response to detecting the predetermined event, the key management service generating a new cryptographic key for the client application and creating a new generational index that corresponds to the new cryptographic key; and mapping, by the key management service, the key proxy of the client application to the new generational index and the new cryptographic key.

10. An article of manufacture comprising a non-transitory processor-readable storage medium having stored therein program code of one or more software programs, wherein the program code is executable by one or more processors to implement a method comprising:

receiving, by a key management service executing on a first computing system, a data decryption request from a client application executing on a second computing system, wherein the data decryption request comprises encrypted data, a generational index associated with the encrypted data, and a key proxy assigned to the client application, wherein the key proxy comprises a unique identifier of a set of one or more cryptographic keys associated with the key proxy assigned to the client application;

determining, by the key management service, the generational index associated with the encrypted data, wherein the generational index identifies a generation of a given cryptographic key which is included in the set of one or more cryptographic keys associated with the key proxy and which was used to create the encrypted data;

obtaining, by the key management service, the generation of the cryptographic key from a secure key vault, which is mapped to the received key proxy and the determined generational index;

decrypting, by the key management service, the encrypted data using the obtained cryptographic key to generate decrypted data; and sending, by the key management service, the decrypted data to the client application.

11. The article of manufacture of claim 10, wherein the key proxy comprises a key proxy tag that is stored as metadata in association with the encrypted data.

12. The article of manufacture of claim 10, wherein:

the generational index comprises a generational index tag that is stored as metadata in association with the encrypted data; and the key management service extracts the generational index tag from the metadata of the encrypted data to determine the generational index associated with the encrypted data.

13. The article of manufacture of claim 10, wherein the program code is executable by the one or more processors to implement a method comprising:

receiving, by the key management service, credentials of the client application;

authenticating, by the key management service, the client application using the received credentials; and initiating, by the key management service, a secure communications channel between the first and second computing systems in response to the client application being authenticated;

wherein the data decryption request is received by the key management service over the secure communications channel; and wherein the decrypted data is sent by the key management service to the client application over the secure communications channel.

14. The article of manufacture of claim 13, wherein the program code for authenticating the client application using the received credentials, comprises program code that is executable by the one or more processors to implement a method comprising:

comparing, by the key management service, the received credentials of the client application to a client identifier associated with the received key proxy to determine whether the received credentials match the client identifier associated with the received proxy; and authenticating the client application, in response to determining that the received credentials match the client identifier associated with the received key proxy.

15. The article of manufacture of claim 10, wherein the program code is executable by the one or more processors to implement a method comprising:

receiving, by the key management service, a data encryption request from the client application, wherein the data encryption request comprises data to be encrypted and the key proxy assigned to the client application;

determining, by the key management service, a current generational index associated with the key proxy, wherein the current generational index identifies a primary version of a cryptographic key which is associated with the key proxy and which is used, by default, to encrypt the data received from the client application;

obtaining, by the key management service, the primary version of the cryptographic key from the secure key vault, which is mapped to the received key proxy and the current generational index;

encrypting, by the key management service, the received data using the obtained cryptographic key to generate encrypted data; and sending, by the key management service, the encrypted data to the client application.

16. The article of manufacture of claim 10, wherein the program code is executable by the one or more processors to implement a method comprising:

receiving, by the key management service, a key proxy assignment request from a second client application;

assigning, by the key management service, a key proxy to the second client application;

generating, by the key management service, a new cryptographic key for the second client application; and storing, by the key management service, the new cryptographic key in the secure key vault in association with the assigned key proxy and an initial generational index.

17. The article of manufacture of claim 16, wherein assigning, by the key management service, the key proxy to the second client application comprises:

generating, by the key management service, a key proxy for the second client application; and sending, by the key management service, the generated key proxy to the second client application.

18. The article of manufacture of claim 10, wherein the program code is executable by the one or more processors to implement a method comprising:

monitoring, by the key management service, for the occurrence of a predetermined event that mandates rotation of a current cryptographic key associated with the key proxy assigned to the client application;

in response to detecting the predetermined event, the key management service generating a new cryptographic key for the client application and creating a new generational index that corresponds to the new cryptographic key; and mapping, by the key management service, the key proxy of the client application to the new generational index and the new cryptographic key.

19. A computing system, comprising:

at least one processor; and a system memory configured to store program code, wherein the program code is executable by the at least one processor to instantiate a key management service, wherein the key management service is configured to:

receive a data decryption request from a client application executing on a second computing system, wherein the data decryption request comprises encrypted data, a generational index associated with the encrypted data, and a key proxy assigned to the client application, wherein the key proxy comprises a unique identifier of a set of one or more cryptographic keys associated with the key proxy assigned to the client application;

determine the generational index associated with the encrypted data, wherein the generational index identifies a generation of a given cryptographic key which is included in the set of one or more cryptographic keys associated with the key proxy and which was used to create the encrypted data;

obtain the generation of the cryptographic key from a secure key vault, which is mapped to the received key proxy and the determined generational index;

decrypt the encrypted data using the obtained cryptographic key to generate decrypted data; and send the decrypted data to the client application.

20. The computing system of claim 19, wherein the key management service is configured to:

receive a data encryption request from the client application, wherein the data encryption request comprises data to be encrypted and the key proxy assigned to the client application;

determine a current generational index associated with the key proxy, wherein the current generational index identifies a primary version of a cryptographic key which is associated with the key proxy and which is used, by default, to encrypt the data received from the client application;

obtain the primary version of the cryptographic key from the secure key vault, which is mapped to the received key proxy and the current generational index;

encrypt the received data using the obtained cryptographic key to generate encrypted data; and send the encrypted data to the client application.

\* \* \* \* \*